(12) United States Patent
Chen et al.

(10) Patent No.: US 7,058,411 B2
(45) Date of Patent: Jun. 6, 2006

(54) WIRELESS COMMUNICATION POSITIONING METHOD AND SYSTEM

(75) Inventors: Wei-Jou Chen, Hsinchu (TW); Che-Chih Chiang, Taichung (TW)

(73) Assignee: Benq Corporation, Taoyuan (TW)

( * ) Notice: Subject to any disclaimer, the term of this patent is extended or adjusted under 35 U.S.C. 154(b) by 163 days.

(21) Appl. No.: 10/909,819

(22) Filed: Aug. 2, 2004

(65) Prior Publication Data

US 2005/0032526 A1 Feb. 10, 2005

(30) Foreign Application Priority Data

Aug. 6, 2003 (TW) ............................... 92121463 A (51) Int. Cl.
*H04Q 7/20* (2006.01)

(52) U.S. Cl. .............................. 455/456.1; 455/404.2; 455/414.2; 455/432.1; 455/456.2; 455/456.3; 455/456.4; 455/456.5; 455/456.6; 455/457; 340/989; 342/457; 180/169; 701/217

(58) Field of Classification Search ............. 455/404.2, 455/414.2, 432.1, 456.1–457; 340/989–994, 340/995.28; 342/457, 417; 180/169; 701/217, 701/224, 225
See application file for complete search history.

(56) References Cited

U.S. PATENT DOCUMENTS

| | | | | |
|---|---|---|---|---|
| 4,660,161 A | * | 4/1987 | Okada | 702/92 |
| 5,154,248 A | * | 10/1992 | Schwager et al. | 180/168 |
| 5,331,276 A | * | 7/1994 | Polvani et al. | 324/160 |
| 5,467,084 A | * | 11/1995 | Alofs et al. | 340/933 |
| 6,114,995 A | * | 9/2000 | Ketchum | 342/457 |
| 6,546,336 B1 | * | 4/2003 | Matsuoka et al. | 701/213 |

* cited by examiner

*Primary Examiner*—Steve M. D'Agosta
(74) *Attorney, Agent, or Firm*—Thomas, Kayden, Horstemeyer & Risley (57) ABSTRACT

A wireless communication positioning method for determining the position of a mobile station when connecting to a base station. The coordinates of the mobile station are estimated according to the geomagnetic field strength measured by the mobile station, and the distance between the base station and the mobile station. The present invention further provides a method for solving the problem of acquiring two or more possible coordinates using the positioning method. The correct coordinates of the mobile station are determined by relocating the mobile station using the same method when the mobile station moves to another position aided by a direction of movement detected by the mobile station.

19 Claims, 8 Drawing Sheets

WIRELESS COMMUNICATION POSITIONING METHOD AND SYSTEM

BACKGROUND OF THE INVENTION

1. Field of the Invention

The present invention relates to a positioning method and system, and particularly to a wireless communication positioning method and system aided by geomagnetic information.

2. Description of the Related Art

Figure 1:
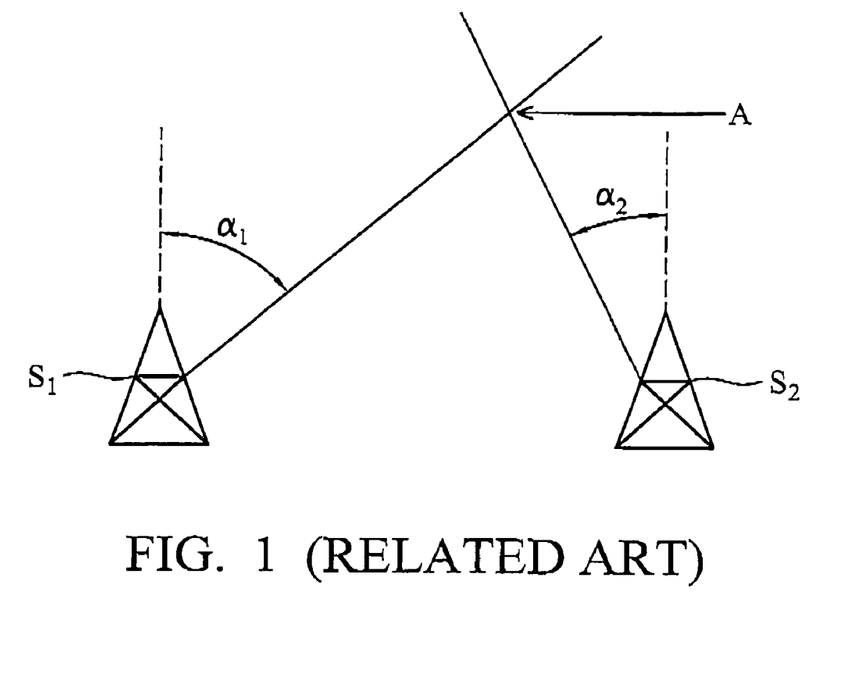
FIG. 1 is a diagram illustrating the angle of arrival (AOA) positioning method.
Figure 2:
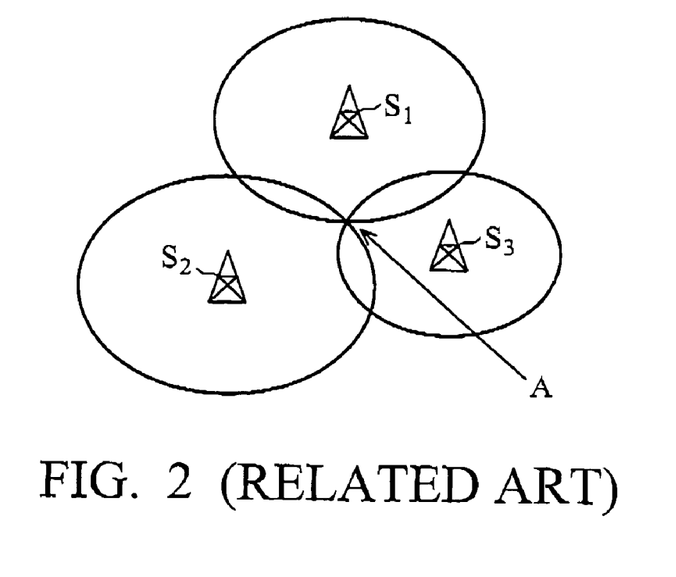
FIG. 2 is a diagram illustrating the time of arrival (TOA) positioning method.
Figure 3:
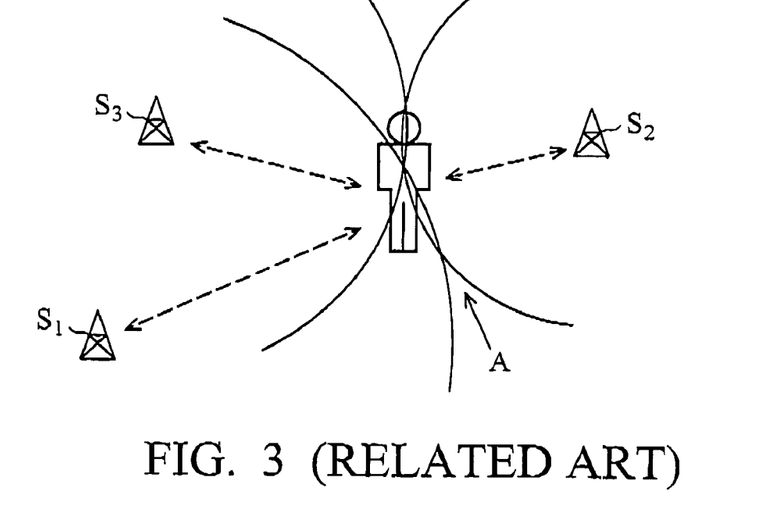
FIG. 3 is a diagram illustrating the time difference of arrival (TDOA) positioning method.

Most conventional positioning techniques determine the location of a mobile station according to signals transmitted from the mobile station to a plurality of base stations. Some popular positioning techniques are 'angle of arrival (AOA)', 'time of arrival (TOA)', and 'time difference of arrival (TDOA)' positioning methods. FIG. 1 illustrates the AOA positioning method for positioning a mobile station at point A. Angles $\alpha 1$ and $\alpha 2$ are calculated once base stations S1 and S2 receive signals from the mobile station. Point A is located at the position, which forms an angle $\alpha 1$ with base station S1 and an angle $\alpha 2$ with base station S2. FIG. 2 illustrates the TOA positioning method for positioning a mobile station at point A. Distances between the mobile station and each base station S1, S2, and S3 can be estimated by the time spent in transmission. As shown in FIG. 2, three circles can be drawn using the positions of base stations S1, S2, and S3 as centers, and distances between each base station and the mobile station as radii. Point A is the intersection of these three circles. FIG. 3 illustrates the TDOA method for positioning a mobile station at point A. Point A is found by computing two functions, and point A is located at the intersection of the two curves representing these two functions. The first function is derived from the transmission time difference between base stations S1 and S2, and the second function is derived from the transmission time difference between base stations S2 and S3. Another popular positioning method is estimating the distance between a base station and a mobile station according to the strength of a received signal. Similarly, the location of the mobile station can be estimated by computing the distance information from three different base stations. A limitation of the conventional positioning methods discussed above is that information such as angle, time, or signal strength must be collected from at least two base stations, so that a single location can be determined.

The AOA positioning method is not suitable for urban environments with high building density as the measured angles are greatly affected thereby. In order to determine a single location, both the TOA positioning method and TDOA positioning method require at least two base stations to estimate the transmission time. The positioning method based on signal strength also require three base stations to measure signal strength, and estimating the distance according to signal strength usually generates excessive errors.

The present invention provides a positioning method requiring only one base station aided by geometric measurements. The positioning method of the present invention can be easily implemented in the 3G telecommunication system to provide positioning services such as electronic mapping.

SUMMARY OF THE INVENTION

The object of the present invention is to provide a positioning method and system which only requires a single base station.

Another object of the present invention is to provide a low cost positioning system that can be easily integrated into an existing mobile communication system. Thus, telecommunication service providers are able to add positioning to existing services in an easy and efficient manner.

In order to achieve these objects, the present invention provides a positioning method for positioning a mobile station which is connected to a base station. The positioning method determines the coordinates of the mobile station with the aid of geomagnetic information and the distance between the mobile station and the base station. The positioning method of the present invention includes providing a geomagnetic field strength database to the base station, wherein the database stores a list of isomagnetic lines, and each isomagnetic line comprises coordinates with the same geomagnetic field strength. The distance between the mobile station and the base station can be estimated according to the timing information carried by a signal transmitted from the mobile station. The mobile station measures the geomagnetic field strength, and sends the measurement back to the base station. The base station searches a corresponding isomagnetic line from the geomagnetic field strength database using the measurement as a search key. Finally, the base station combines the estimated distance with the corresponding isomagnetic line to obtain possible coordinates of the mobile station.

The positioning method of the present invention further comprises steps solving the problem of acquiring two or more possible coordinates for the mobile station according to the above positioning method. In the case of acquiring two or more possible positions, the base station stores possible coordinates. The mobile station measures a most recent geomagnetic field strength and its direction when moving to a new position, and then sends the new measurements back to the base station. Similarly, a corresponding isomagnetic line in the geomagnetic field strength database is found using the most recent geomagnetic field strength as a search key. The distance between the mobile station and the base station is also updated according to the most recent signal transmitted from the mobile station. Once again, possible coordinates of the mobile station are found by satisfying the parameters updated distance from the base station as well as the corresponding isomagnetic line. If there are still two or more locations that satisfied both parameters, the base station judges the position of the mobile station according to the direction of movement measured by the mobile station.

The present invention additionally provides a method for ensuring the reliability and accuracy of positioning data. The method includes periodically measurement of instantaneous geomagnetic information for the coverage area of the base station, and updating the geomagnetic field strength database. Furthermore, a parameter for compensating the geomagnetic field strength affected by the electromagnetic wave emitted from the antenna of the base station is also determined before searching the isomagnetic line from the geomagnetic field strength database. This parameter compensates the measured geomagnetic field strength from the mobile station to remove the effect of the electromagnetic wave.

The method for estimating the distance between the base station and the mobile station in the present invention is the round trip time (RTT) delay method or the received signal strength indicator (RSSI) method The RTT delay method estimates the distance between the transmitter and the receiver according to the transmission time, and the RSSI method estimates the distance according to the received signal strength.

The present invention also provides a wireless communication positioning system, comprising a base station and a mobile station. The base station comprises a core communication system and a geomagnetic field strength database. The geomagnetic field strength database stores isomagnetic lines, and each isomagnetic line comprises a set of positions with equal geomagnetic field strength. The mobile station comprises a core communication system and a magnetic detection device. The positioning system of the present invention executes the positioning method described above, which locates the mobile station according to a distance estimated by the base station and a geomagnetic field strength measured by the mobile station.

The mobile station of the positioning system further comprises a movement direction sensor to measure the current direction of movement. The direction of movement measurement is then transmitted to the base station with the current geomagnetic field strength when there are two or more possible locations found according to the positioning system. The direction of movement measurement is then used to identify the position of the mobile station.

The base station of the positioning system further comprises an earth inductor and a memory, wherein the earth inductor measures instantaneous geomagnetic field strength around the base station for updating the geomagnetic field strength database, and the memory stores previous positioning information such as possible coordinates when there are two or more positioning results.

The magnetic detection device and the movement direction sensor of the mobile station in the positioning system of the present invention can be implemented in the same hardware device or in two separate hardware devices. The magnetic detection device and the movement direction sensor can be implemented inside the mobile station, or as an external device connected to the original mobile station. Electronic compasses, earth induction compasses, and superconductivity magnetometers are some alternatives for implementing the magnetic detection device and the movement direction sensor.

These and other objectives of the present invention will be obvious to those of ordinary skill in the art after reading the following detailed description of the preferred embodiment, illustrated in the various Figures and drawings.

BRIEF DESCRIPTION OF THE DRAWINGS

The present invention will become more fully understood from the detailed description given herein and the accompanying drawings, given by way of illustration only and thus not intended to be limitative of the present invention.

DETAILED DESCRIPTION OF THE INVENTION

Figure 4:
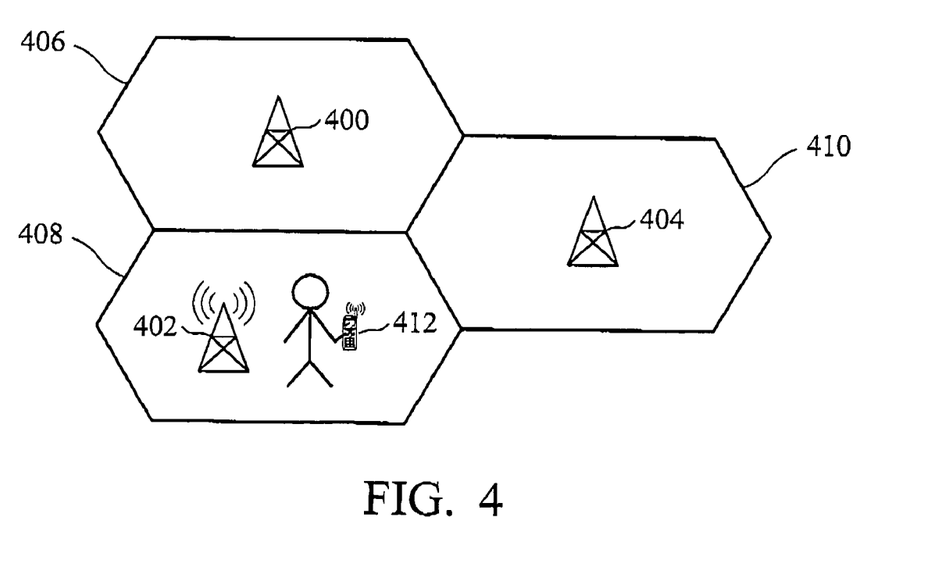
FIG. 4 is a diagram illustrating a wireless communication system.

The present invention provides a positioning method and system thereof for a wireless communication system. As shown in FIG. 4, the wireless communication system comprises a mobile station 412, and base stations 400, 402, and 404 covering wireless transmission inside cells 406, 408, and 410 respectively. The mobile station 412 can always connect to one of the base stations if the user is within the coverage area of the wireless communication system. In this example, the mobile station 412 is connected to the base station 402, as the user of the mobile station is located in the coverage area of cell 408. Coordinates showing both longitude and latitude and the coverage area of each base station are recorded in the database of the telecommunication service provider at the time of construction. Thus, the operation of connecting the mobile station 412 to the base station 402 provides information to the system indicating the mobile station 412 is within the cell 408.

Figure 5A:
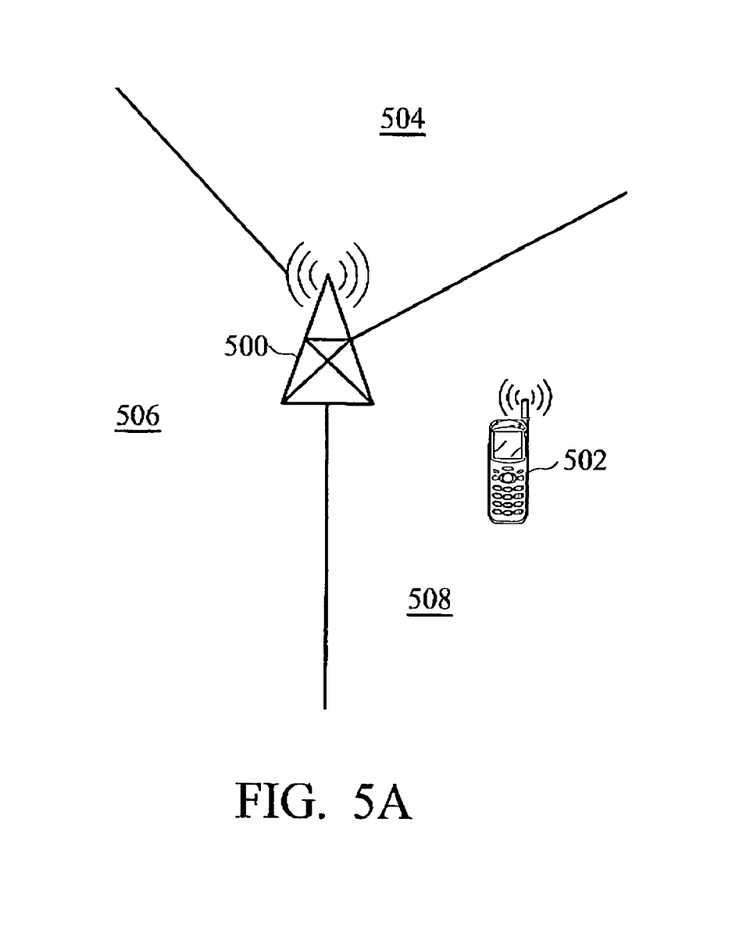
FIG. 5A~FIG. 5E are diagrams illustrating an embodiment of the positioning method provided in the present invention.

Directional antennas are often used in base stations to transmit and receive signals. A directional antenna with n transmission directions divides the coverage area of the base station (i.e. cell area) into n sectors. Possible positions of the mobile station are hence narrowed down from positions in a cell to positions in a sector within the cell according to signals transmitted from the mobile station to the base station, If there are more sectors in a cell, the coverage area of each sector becomes smaller, which corresponds to a greater probability of acquiring only one possible position for the mobile station at the first trial. As shown in FIG. 5A, an example of a cell with three sectors is used to describe an embodiment of the present invention. The base station 500 in FIG. 5A has a directional antenna which divides the cell into three sectors 504, 506, and 508. The mobile station 502 sends a signal to the base station 500 while establishing a connection with the base station 500. The system determines that the mobile station 502 is within sector 508 of the base station 500 through the connection process.

Figure 5B:
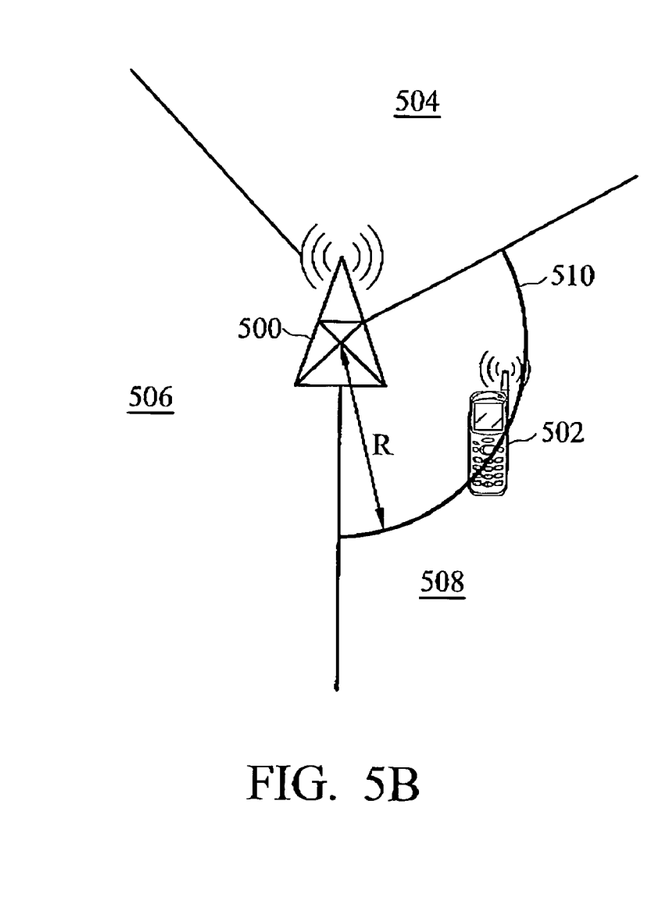

When the mobile station 502 sends a signal to the base station 500, a time stamp tagged to the signal is recorded. The time stamp indicates the time of transmission from the mobile station 502, and is compared with the received time at the base station 500. The difference between these two times is called the round trip delay (RTT), and RTT can be used to estimate the distance R between the mobile station 502 and the base station 500. As shown in FIG. 5B, an arc 510 can be drawn assuming the base station 500 is the center and the distance R is the radius of the circle. The width of the arc 510 represents an expected error of the distance R.

Figure 5C:
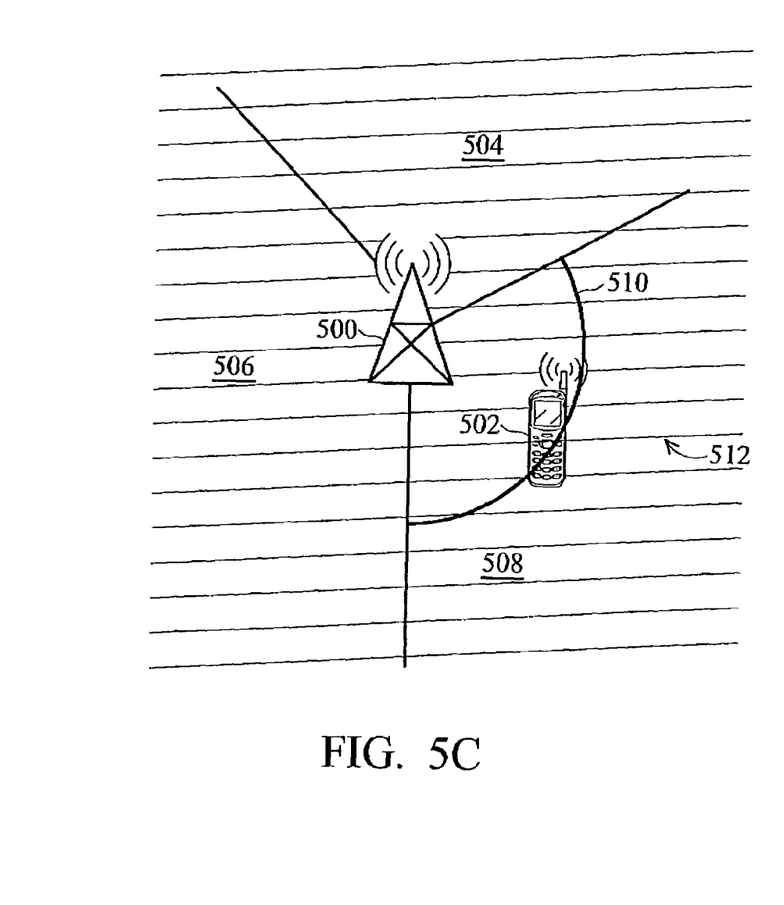

The mobile station 502 measures geomagnetic field strength, and then transmits the measurement back to the base station 500. The base station 500 has a geomagnetic field strength database consisting of several isomagnetic lines. Points on an isomagnetic line represent coordinates with same geomagnetic field strength. The geomagnetic field strength database is modified frequently according to the instantaneous geomagnetic field strength measured by the base station to ensure that the data in the database has sufficient reliability. The horizontal lines in FIG. 5C represent several isomagnetic lines stored in the geomagnetic field database. In this example, the base station 500 searches a corresponding isomagnetic line 512 from the database using the geomagnetic field strength measured by the mobile station 502 as a search key. As a result, the precise location of the mobile station 502 is the intersection of isomagnetic line 512 and arc 510 calculated from the estimated distance R. Although the isomagnetic lines are drawn as straight lines in this example, this is not always the case in practice. It is reasonable to assume the isomagnetic lines are straight as isomagnetic lines are typically nearly straight.

Figure 5D:
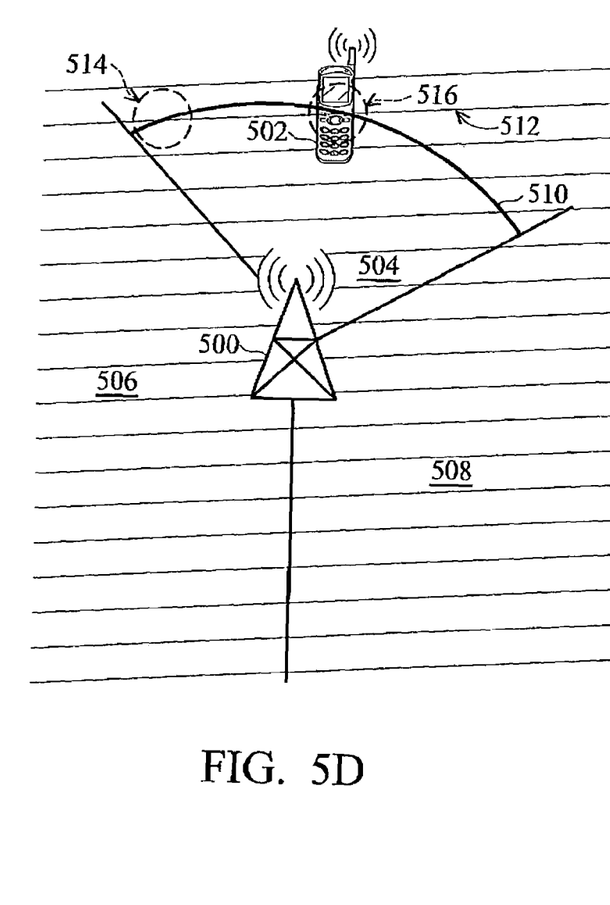
Figure 5E:
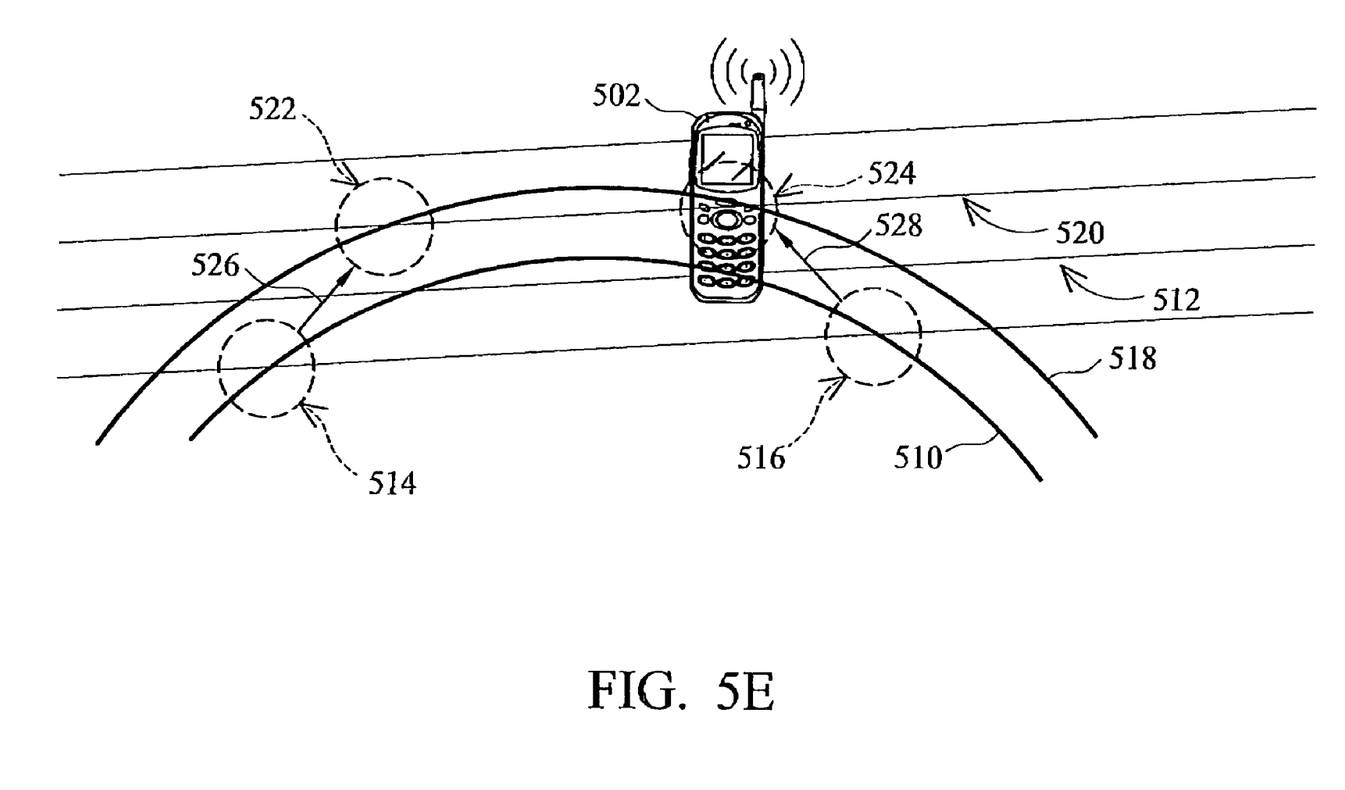

If the mobile station 502 is in sector 504, and the mobile station 502 is still having a distance R apart from the base station 500 as shown in FIG. 5D, an arc 510, and an isomagnetic line 512 can be found according to the positioning method of the present invention. In FIG. 5D, the arc 510 and the line 512 intersect at locations 514 and 518. In the situation of obtaining two intersections as possible positions for the mobile station, additional steps are necessary to determine the correct location. The base station 500 records the coordinates of locations 514 and 516, and the mobile station 502 measures most recent geomagnetic field strength and a direction of movement when the mobile station 502 moves to another position. As shown in FIG. 5E, after the mobile station 502 sends these measurements back to the base station, a new arc 518 can be drawn according to the estimated distance R', and a new isomagnetic line 520 can be found according to the most recent geomagnetic field strength measurement. As shown in FIG. 5E, there are still two possible positions 522 and 524 for the mobile station 502 as the arc 518 cuts the line 520 at two points. The direction of movement measured by the mobile station 502 is hence used to compare the directions 526 (from position 514 to position 522) and 528 (from position 516 to position 524), in order to determine the current coordinates of the mobile station 502.

Figure 6:
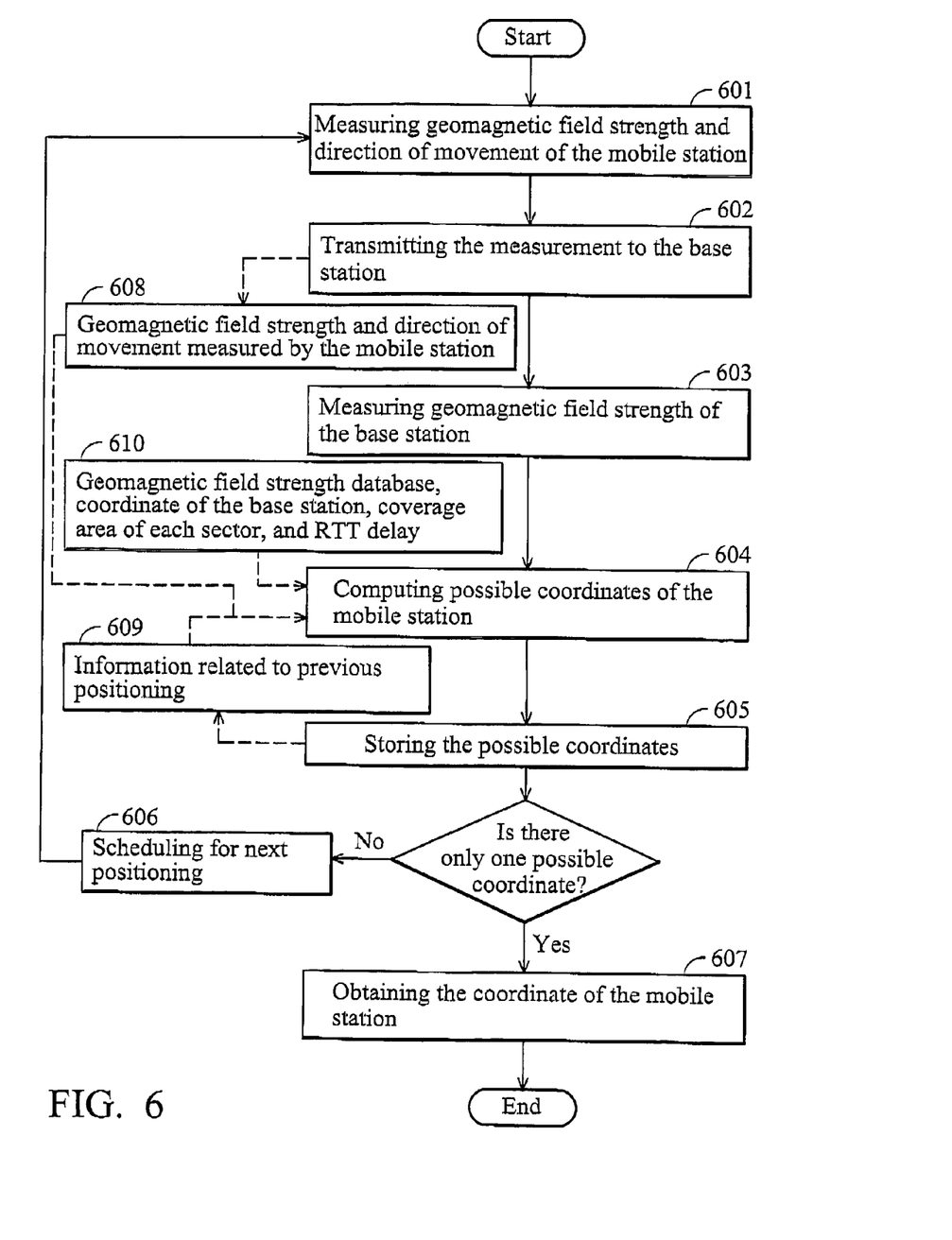
FIG. 6 is a flowchart describing the positioning method of the present invention.

The wireless communication positioning method described above is expressed by the flowchart shown in FIG. 6. Steps 601 and 602 describe the operations performed by the mobile station, and steps 603 to 607 describe the operations performed by the base station. Steps 608 to 610 illustrate the process of storing information in the base station. Solid lines in the flowchart show the flow of control processes, and dotted lines show the flow of real data. In step 601, the mobile station measures geomagnetic field strength and direction of movement when not transmitting signals. This restriction avoids interference between the original communication system and the positioning system of the mobile station. The mobile station then transmits the measured data to the base station in step 602, and the measured data is stored in the base station as described in step 608. The base station stores the geomagnetic field strength database as shown in step 610, and the database is updated frequently according to the current geomagnetic field strength measured by the base station in step 603. The database is also modified by a parameter that compensates for the effect of electromagnetic waves on the geomagnetic field strength measurement in each sector. The base station also stores information for calculating the possible coordinates of the mobile station as shown in step 604, the information includes the coordinate of the base station, coverage area of each sector, and the relationship between round trip delay and distance. After the base station calculates the possible coordinates in step 605, these possible coordinates are stored as shown in step 605. If there is only one possible coordinate, the base station processes step 607 and terminates this positioning operation, otherwise, the base station reschedules a time for positioning the mobile station again in step 606, and returns to step 601.

Figure 7A:
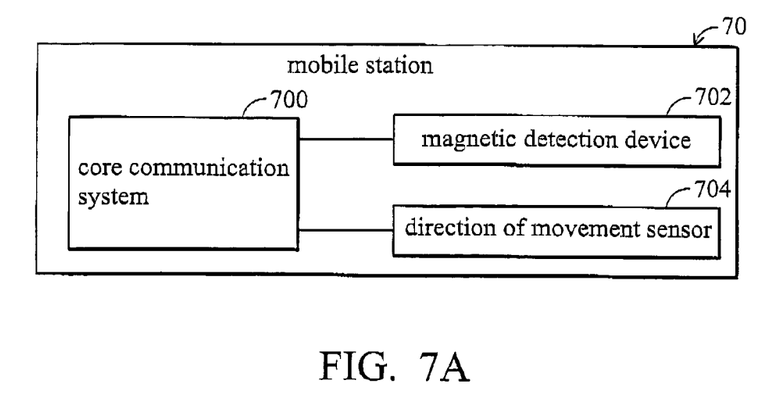
FIG. 7A and FIG. 7B are block diagrams illustrating two possible embodiments of the mobile station according to the positioning system of the present invention.
Figure 7B:
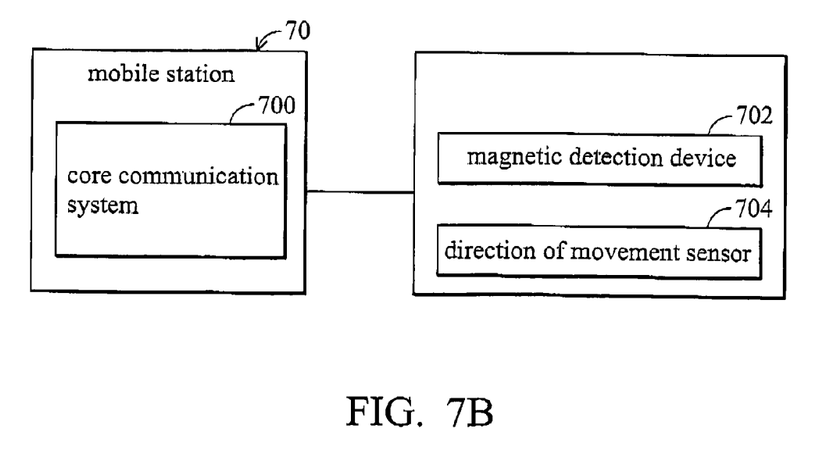

FIG. 7A shows a simple block diagram of a mobile station 70 for performing the positioning method of the present invention. As shown in FIG. 7A, a magnetic detection device 702 and a movement direction sensor 704 for measuring the geomagnetic field strength and the direction of movement connected with the core communication system 700 of the mobile station. In FIG. 7B, these two additional modules, magnetic detection device 702, and direction of movement sensor 704 can also be implemented in an external device, which is coupled to the original mobile station 70.

Figure 8:
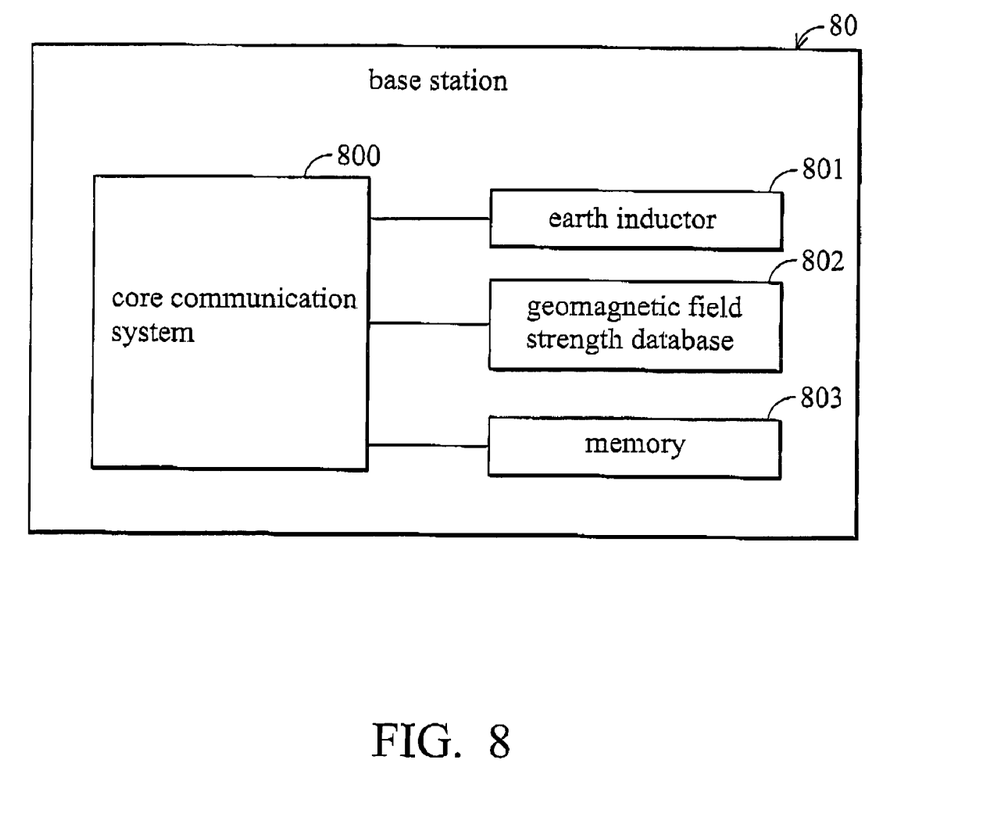
FIG. 8 is a block diagram illustrating an embodiment of the base station according to the positioning system of the present invention.

FIG. 8 shows the block diagram of the base station for implementing the positioning method of the present invention. The base station requires additional modules such as earth inductor 801, geomagnetic field strength database 802, and memory block 803. These modules are connected to the core communication system 800 of the base station.

The foregoing descriptions of the embodiment of this invention has been presented for purposes of illustration and description. Obvious modifications or variations are possible in light of the above teaching. The embodiment was chosen and described to provide the best illustration of the principles of this invention and its practical application to thereby enable those skilled in the art to utilize the invention in varies applications. All such modifications and variations are within the scope of the present invention as determined by the appended claims when interpreted in accordance with the breadth to which they are fairly, legally, and equitably entitled.

What is claimed is:

1. A wireless communication positioning method for a mobile station communicating with a base station, comprising the steps of:

providing a geomagnetic field strength database to the base station; wherein the geomagnetic field strength database stores isomagnetic lines, and each isomagnetic line comprises coordinates with equal geomagnetic field strength;

instructing the mobile station to measure geomagnetic field strength as a first measurement, and sending the first measurement to the base station;

estimating a distance R between the mobile station and the base station according to a first signal transmitted from the mobile station, thereby the mobile station is known to be on an arc with the base station as its center and the distance R as its radius;

searching for an isomagnetic line corresponding to the first measurement in the geomagnetic field strength database; and positioning the mobile station by finding coordinates satisfying both parameters of distance R away from the base station and lying on the isomagnetic line.

2. The positioning method as claimed in claim 1, wherein if two or more coordinates satisfy the two parameters, the positioning method further comprising the steps of:

recording all coordinates satisfying the two parameters;

instructing the mobile station to measure geomagnetic field strength and a direction of movement as a second measurement when the mobile station moves, and sending the second measurement to the base station;

estimating a distance R' between the mobile station and the base station according to a second signal transmitted from the mobile station;

searching for a new isomagnetic line corresponding to the second measurement in the geomagnetic field strength database;

positioning the mobile station by finding a new coordinate satisfying both parameters of having the distance R' away from the base station and lying on the new isomagnetic line; and determining one of the new coordinates according to the direction of movement in the second measurement if two or more new coordinates satisfy both parameters.

3. The positioning method as claimed in claim 1 wherein the base station further detects most recent geomagnetic field strength to update the geomagnetic field strength database periodically.

4. The positioning method as claimed in claim 1 wherein the distance R between the mobile station and the base station is estimated using a round trip time (RTT) delay technique.

5. The positioning method as claimed in claim 1 wherein the distance R between the mobile station and the base station is estimated using a received signal strength indicator (RSSI) technique.

6. The positioning method as claimed in claim 1 wherein the first signal comprises the first measurement.

7. The positioning method as claimed in claim 2 wherein the distance R' between the mobile station and the base station is estimated using a round trip time (RTT) delay technique.

8. The positioning method as claimed in claim 2 wherein the distance R' between the mobile station and the base station is estimated using a received signal strength indicator (RSSI) technique.

9. The positioning method as claimed in claim 2 wherein the second signal comprises the second measurement.

10. A wireless communication positioning system, comprising:
   a base station composed of:
   a base station core communication system which transmits and performs communication and controlling operations; and
   a geomagnetic field strength database which stores isomagnetic lines, wherein each isomagnetic line comprises coordinates with equal geomagnetic field strength; and
   a mobile station, comprising:
   a mobile station core communication system which connects with the base station to perform the communication and controlling operations; and
   a magnetic detection device, which measures geomagnetic field strength;
   wherein the wireless communication system performs the following steps:
   measuring geomagnetic field strength as a first measurement using the magnetic detection device of the mobile station;
   sending the first measurement to the base station;
   estimating a distance R between the base station and the mobile station according to a first signal sent from the mobile station to the base station;
   searching for an isomagnetic line corresponding to the first measurement in the geomagnetic field strength database; and
   positioning the mobile station by satisfying both parameters of distance R away from the base station and lying on the isomagnetic line.

11. The positioning system as claimed in claim 10, wherein the base station further comprises an earth inductor, which measures geomagnetic field strength periodically to update the geomagnetic field strength database.

12. The positioning system as claimed in claim 10, wherein the mobile station further comprises a movement direction sensor, which measures a direction of movement of the mobile station, and the direction of movement is transmitted to the base station to position the mobile station when there are two or more possible coordinates for the mobile station.

13. The positioning system as claimed in claim 10, wherein the base station further comprising a memory, which stores previous positioning information.

14. The positioning system as claimed in claim 10, wherein the magnetic detection device in the mobile station is an electronic compass, an earth induction compass, or a superconductivity magnetometer.

15. The positioning system as claimed in claim 10, wherein the magnetic detection device is implemented inside the mobile station or as an external device connected to the mobile station.

16. The positioning system as claimed in claim 11, wherein the earth inductor is an electronic compass, an earth induction compass, or a superconductivity magnetometer.

17. The positioning system as claimed in claim 12, wherein the movement direction sensor is implemented in the same hardware device as the magnetic detection device.

18. The positioning system as claimed in claim 17, wherein the hardware is an electronic compass.

19. The positioning system as claimed in claim 17, wherein the magnetic detection device and the movement direction sensor is either implemented inside the mobile station or as an external device connected to the mobile station.

* * * * *